June 16, 1925.

J. DEMPSEY 1,542,287

MACHINE FOR DEPOSITING SEMIFLUID, PASTY OR DOUGH LIKE MATERIALS

Filed Feb. 19, 1924   3 Sheets-Sheet 1

Fig. 1.

Inventor
John Dempsey

Attorneys

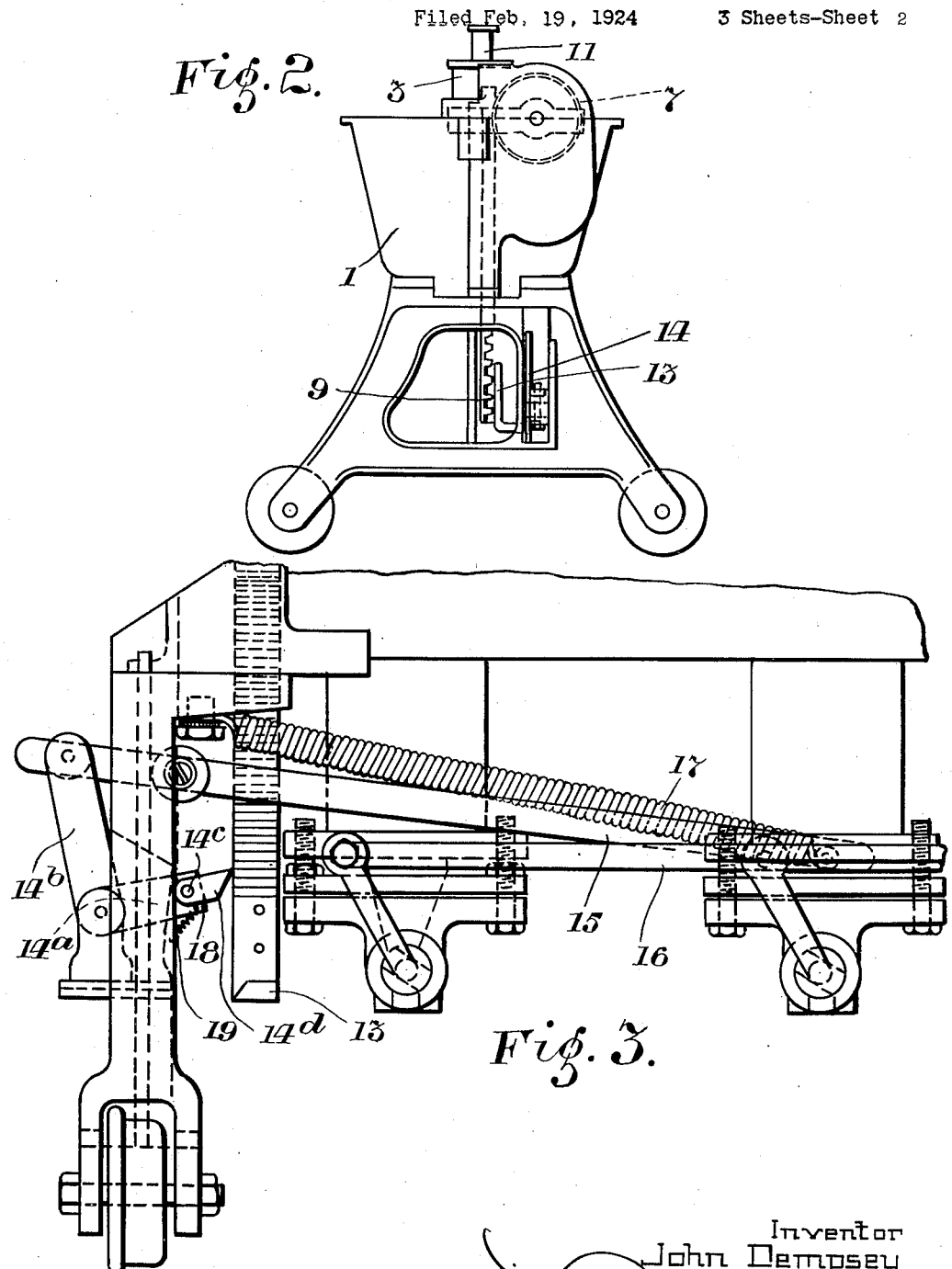

Patented June 16, 1925.

1,542,287

UNITED STATES PATENT OFFICE.

JOHN DEMPSEY, OF BELFAST, IRELAND.

MACHINE FOR DEPOSITING SEMIFLUID, PASTY, OR DOUGHLIKE MATERIALS.

Application filed February 19, 1924. Serial No. 693,870.

*To all whom it may concern:*

Be it known that I, JOHN DEMPSEY, of 6 St. Paul's Terrace, Belfast, Ireland, a subject of the King of Great Britain and Ireland, have invented certain new and useful Improvements Relating to Machines for Depositing Semifluid, Pasty, or Doughlike Materials, of which the following is a specification.

This invention relates to machines for depositing semi-fluid, moistened, or pasty material or materials such as dough, the machine being of the class which comprises a hopper to contain the material to be deposited, a tube below the hopper and opening into it, a reciprocating plunger which at one time is completely withdrawn from the tube into the hopper to permit the tube to be filled from the contents of the hopper and at another time occupies the tube and forces the contents out through a valve which is located in the tube and is closed when the plunger is withdrawn from the tube and which is opened when the plunger is forcing the contents through it.

It is an object of the present invention to use, for this purpose, a machine of the class specified in which the valve is operated by mechanism connected with the means for reciprocating the plunger, the closing of the valve taking place before its plunger completes, or before its plunger begins, its return stroke, whereby a partial vacuum is created in the tube to assist in drawing material from the hopper into the tube when the plunger leaves the tube.

In this way the machine is rendered more positive in action, and is also made capable of dealing not only with materials that are in a fairly fluid condition but also with materials which are of the consistency of dough, this latter class of material in the past having been very difficult to deal with owing to the trouble experienced in getting them to flow from the hopper to the position from which they were ejected.

In the accompanying drawings:—

Fig. 1 is an elevation of a depositing machine in accordance with the invention.

Fig. 2 is an end elevation looking in the direction of the arrow X;

Fig. 3 is a part elevation of a machine similar to Fig. 1 but with operating gear adapted to close the outlet orifices before the plungers begin to rise.

Referring to the drawings:—

Figure 4:
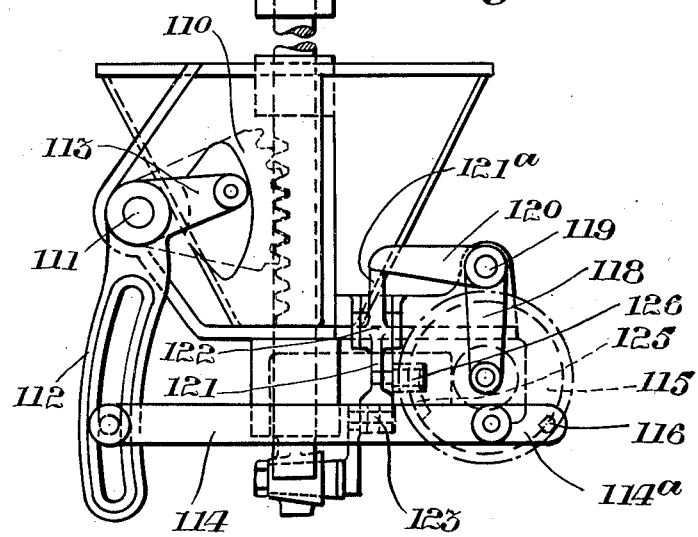
Fig. 4 is an end elevation of part of a machine suitable for power operation.

The machine shown in Figs. 1 and 2 comprises a hopper 1 from the bottom of which a number of tubes 2 extend downwardly. The upper ends of the tubes 2 are open to the interior of the hopper 1 (see Fig. 5) whilst their lower ends are tapered and communicate with valves 4 having their axes horizontal, each valve being arranged immediately below the tapered end of its tube. Plungers 3 having tapered lower ends are provided and are adapted to be moved up and down into and out of the tubes 2. The plungers 3 are reciprocated by an operating handle 5 connected with a spindle 6 which carries toothed wheels 7 and 8 in engagement with racks 9 and 10 secured to a cross bar 11 to which the plungers 3 are attached. The plungers 3 are guided in their reciprocations by guides 12. At the lower end of a rack 9 is a projection 13 adapted to make contact with an arm 14$^a$ of a bell-crank lever 14 whose other arm 14$^b$ is pivotally connected with one end of a link 15, the other end of which link is turnably connected with a bar 16 to which the levers 4$^a$ of the cocks 4 are connected. The arrangement is such that when the plungers 3 are moved down these connections will operate to open the valves 4. When the plungers are raised the member 13 will move up with the rack, and a spring 17, which is put in tension during the downward stroke of the plungers and member 13, will react to close the valves before the plungers complete their upward stroke, thereby creating a partial vacuum in the tubes 2.

In order to close the valves before the plungers commence their upward movement so that a greater vacuum can be created in the tubes 2, the operating gear may be arranged as shown at Fig. 3. In this case the arm 14ª of the bell crank lever 14 is made in two pieces, a toe 14ᵈ being pivoted at 14ᶜ to the main portion of the arm, so that it can turn about its pivot in an upward direction; the movement of the toe in a downward direction is limited by a stop 18 on the said main portion.

When the projection 13 is moved downwards it opens the valves as in the former construction by moving the arm 14ª, link 15, and bar 16 against the spring 17. As the projection 13 approaches the bottom of its stroke it will slide off the end of the toe 14ᵈ owing to the turning of the arm 14ª about its pivot. The arm 14ª being thus released the spring 17 acts to close the valves just as the plungers reach the end of their stroke. On the upstroke of the plungers and projection 13, the latter is enabled to pass the toe 14ᵈ owing to the before-mentioned arrangement whereby the said toe can turn upwardly about its pivot 14ᶜ, the toe being brought back by a spring 19 to its normal position when the projection 13 has passed said toe.

Figure 5:
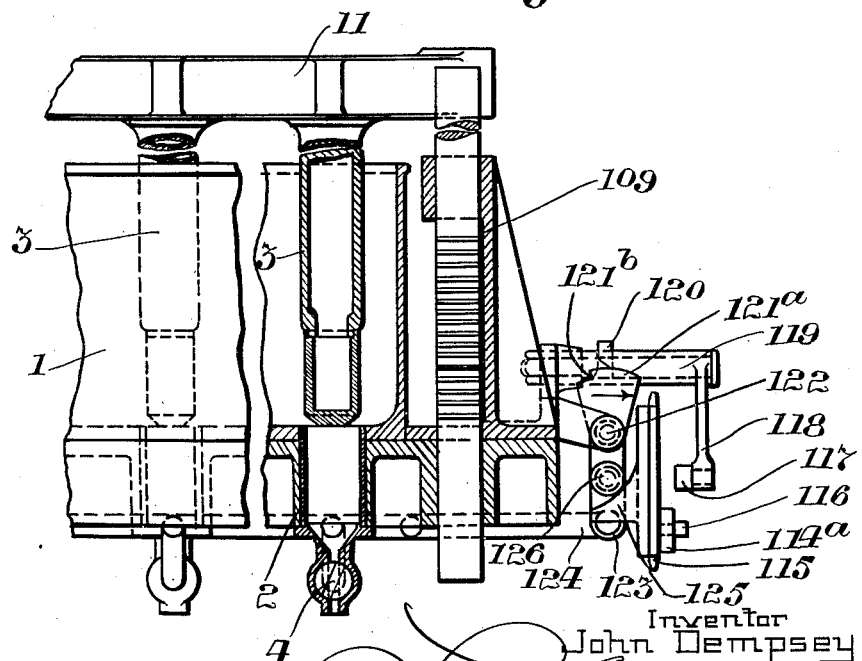
Fig. 5 is a side elevation partly in section of part of the machine shown in Fig. 4.

The modification shown in Figs. 4 and 5 which is suitable for power operation will now be described.

The cross bar 11 has the plungers 3 cast solid with it. A rack 109 has its top removably located in but rigidly attached to the cross bar 11 so that as the rack moves it carries the cross bar with it. Gearing with the rack 109 is a toothed quadrant 110 which is pivoted to the frame of the machine at 111; also pivoted at 111 is a slotted quadrant 112 having a second arm 113 connected to the toothed quadrant. A link 114 has one end adjustably connected to the slotted quadrant 112 and its other end is eccentrically pivoted to a chain wheel 115 which is driven in any convenient manner. An extension 114ª of the link 114 carries a roller 116 adapted to engage with a roller 117 mounted upon one arm 118 of a bell crank lever which is pivoted to the frame of the machine at 119. The other arm 120 engages a projecting arm 121ª of a lever 121 pivoted at 122 and connected at its end 123 with a link 124 connected to the cocks of the machine. The chain wheel 115 has formed on it a cam 125; a roller 126 carried by the lever 121 is engaged by the cam 125 as the wheel rotates and is moved thereby so as to move the arm 121ª in the direction of the arrow until the arm 120 engages the notch 121ᵇ, at which position the cocks of the machine will be open and held open until the arm 120 is knocked clear of the arm 121ª by the roller 116 coming into contact with the roller 117 whereupon the lever 121 will under spring action on the link 124 close the cocks of the machine. This cycle of operation is repeated whilst the machine is working.

This trip gear operates the valves so that the closing thereof takes place before the plungers complete or begin their return stroke; it provides a positive action independent of the adjustment of the link 114, so that the throw of the plungers can be altered without interfering with it.

The plungers in their upward movement are withdrawn from the tubes 2 into the material in the hopper which, being of the consistency of dough, would normally remain in position (or would collapse slowly) and would so form a wall around the space from which the plunger had been withdrawn immediately above the tube. Owing however, to the vacuum assisted by gravity, the dough-like material will be drawn into this space and into the tube itself until the latter is filled, so that on the downward movement of the plunger the latter will force the material out through the valve.

Any number of tubes and plungers can be provided according to the desired number of pieces to be deposited at each operation of the machine.

The machine is, preferably, moved by hand over the hot plate, or elsewhere, as required to deposit the material in rows according to the number of tubes in the receptacle.

Having now fully described my invention what I claim and desire to secure by Letters Patent is:—

1. A machine for depositing semi-fluid, moistened or pasty material having in combination a hopper, a tube below the hopper and opening into it, a reciprocating plunger to eject material from the tube, means to reciprocate the plunger, a valve at the lower end of the tube, a lever for operating the valve, a reciprocating rack as part of the plunger reciprocating means, a projection on the lower end of the rack, a bell crank lever pivoted to the frame of the machine and having one arm in the path of the projection, a link connected to the other arm, a bar connected to the link and to the valve lever, and means to return the bar to normal position to close the valves.

2. A machine for depositing semi-fluid, moistened or pasty material having in combination a hopper, a tube below the hopper and open to the bottom of the latter, a reciprocating plunger adapted at times to enter the tube and eject material from it, a cross-bar to which the plunger is attached, means to reciprocate the plunger comprising a reciprocating rack attached to the cross-bar a gear wheel gearing with the rack and a handle to rotate the gear wheel, a valve at the lower end of the tube, a lever for operating the valve, a projection on the lower end of the rack, a bell-crank lever pivoted to the frame of the machine and having one arm in the path of the projection, a link connected to the other arm, a reciprocating bar connected to the link and to the valve lever, and means to return the bar and link to normal position to close the valve when permitted to do so by the projection on the rack.

In testimony whereof I affix my signature in presence of two witnesses.

JOHN DEMPSEY.

Witnesses:
 ANDREW HAMILTON,
 JOHN HERBERT HUNTER.